United States Patent
Rhodes et al.

(10) Patent No.: US 10,513,198 B2
(45) Date of Patent: Dec. 24, 2019

(54) ELECTRIFIED VEHICLE WIRELESS CHARGING SYSTEM AND CHARGING METHOD

(71) Applicant: Ford Global Technologies, LLC, Dearborn, MI (US)

(72) Inventors: Kevin James Rhodes, Dearborn, MI (US); Erik Christen, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 80 days.

(21) Appl. No.: 15/921,118

(22) Filed: Mar. 14, 2018

(65) Prior Publication Data
US 2019/0283610 A1   Sep. 19, 2019

(51) Int. Cl.
| | |
|---|---|
| *B60L 53/60* | (2019.01) |
| *H02J 7/02* | (2016.01) |
| *H02J 50/20* | (2016.01) |
| *B60L 53/16* | (2019.01) |
| *B60L 53/12* | (2019.01) |

(52) U.S. Cl.
CPC ............ *B60L 53/60* (2019.02); *B60L 53/12* (2019.02); *B60L 53/16* (2019.02); *H02J 7/025* (2013.01); *H02J 50/20* (2016.02)

(58) Field of Classification Search
CPC .......... B60L 53/60; B60L 53/16; B60L 53/12; H02J 50/20; H02J 7/025
USPC ...................................................... 320/108
See application file for complete search history.

(56) References Cited

U.S. PATENT DOCUMENTS

| | | | |
|---|---|---|---|
| 5,812,095 A | 9/1998 | Adrian et al. | |
| 6,362,594 B2* | 3/2002 | Kajiura | B60L 53/31 320/104 |
| 8,120,311 B2 | 2/2012 | Baarman et al. | |
| 8,242,741 B2* | 8/2012 | Phelps, III | H02J 50/10 320/108 |
| 8,933,663 B2* | 1/2015 | Elias | B60L 11/182 320/108 |
| 9,145,110 B2* | 9/2015 | Van Wiemeersch | B60R 25/1004 |
| 9,156,364 B2* | 10/2015 | Miller | H02J 5/005 |
| 9,260,026 B2* | 2/2016 | Miller | H01F 38/14 |
| 9,623,761 B2* | 4/2017 | Gale | B60L 3/0046 |
| 9,660,392 B2* | 5/2017 | Eckert | H01R 13/7038 |

(Continued)

FOREIGN PATENT DOCUMENTS

KR   101790891   10/2017

OTHER PUBLICATIONS

Demorro, Christopher, WiTriCity Wireless Charging Gains Momentum, EV Obsession, Sep. 3, 2014, retrieved from http://evobsession.com/witricity-wireless-charging-gains-momentum/.

*Primary Examiner* — M Baye Diao
(74) *Attorney, Agent, or Firm* — David Kelley; Carlson, Gaskey & Olds, P.C.

(57) ABSTRACT

An exemplary charging system includes, among other things, a charger that conveys energy wirelessly to an electrified vehicle when the charger is disposed against a surface of the electrified vehicle. The energy is used to charge a traction battery of the electrified vehicle. An exemplary charging method includes, among other things, conveying energy wirelessly from a charger to an electrified vehicle to charge a traction battery of the electrified vehicle. The charger is disposed against a surface of the electrified vehicle during the conveying.

12 Claims, 3 Drawing Sheets

(56) References Cited

U.S. PATENT DOCUMENTS

| | | | |
|---|---|---|---|
| 9,906,066 B2* | 2/2018 | Krishnamurthi | H02J 7/025 |
| 9,950,635 B1* | 4/2018 | Trego | B60L 11/1818 |
| 10,023,061 B2* | 7/2018 | Dudar | B60L 8/003 |
| 2011/0221387 A1* | 9/2011 | Steigerwald | B60L 11/182 320/108 |
| 2012/0206098 A1 | 8/2012 | Kim | |
| 2014/0197693 A1* | 7/2014 | Fujita | H02J 7/027 307/104 |
| 2014/0306655 A1* | 10/2014 | Sadakata | H01F 38/14 320/108 |
| 2016/0031331 A1* | 2/2016 | Altunyurt | B60L 58/12 320/108 |
| 2016/0291095 A1 | 10/2016 | Bell et al. | |
| 2017/0313204 A1* | 11/2017 | Schumann | B60L 53/37 |
| 2018/0025826 A1* | 1/2018 | Nishimura | B60L 5/00 336/199 |
| 2018/0194239 A1* | 7/2018 | Chevret | B60L 5/005 |
| 2018/0236879 A1* | 8/2018 | Elshaer | H02J 50/12 |
| 2018/0272882 A1* | 9/2018 | Fontana | H02M 3/33569 |
| 2018/0354383 A1* | 12/2018 | Namou | B60L 53/12 |

\* cited by examiner

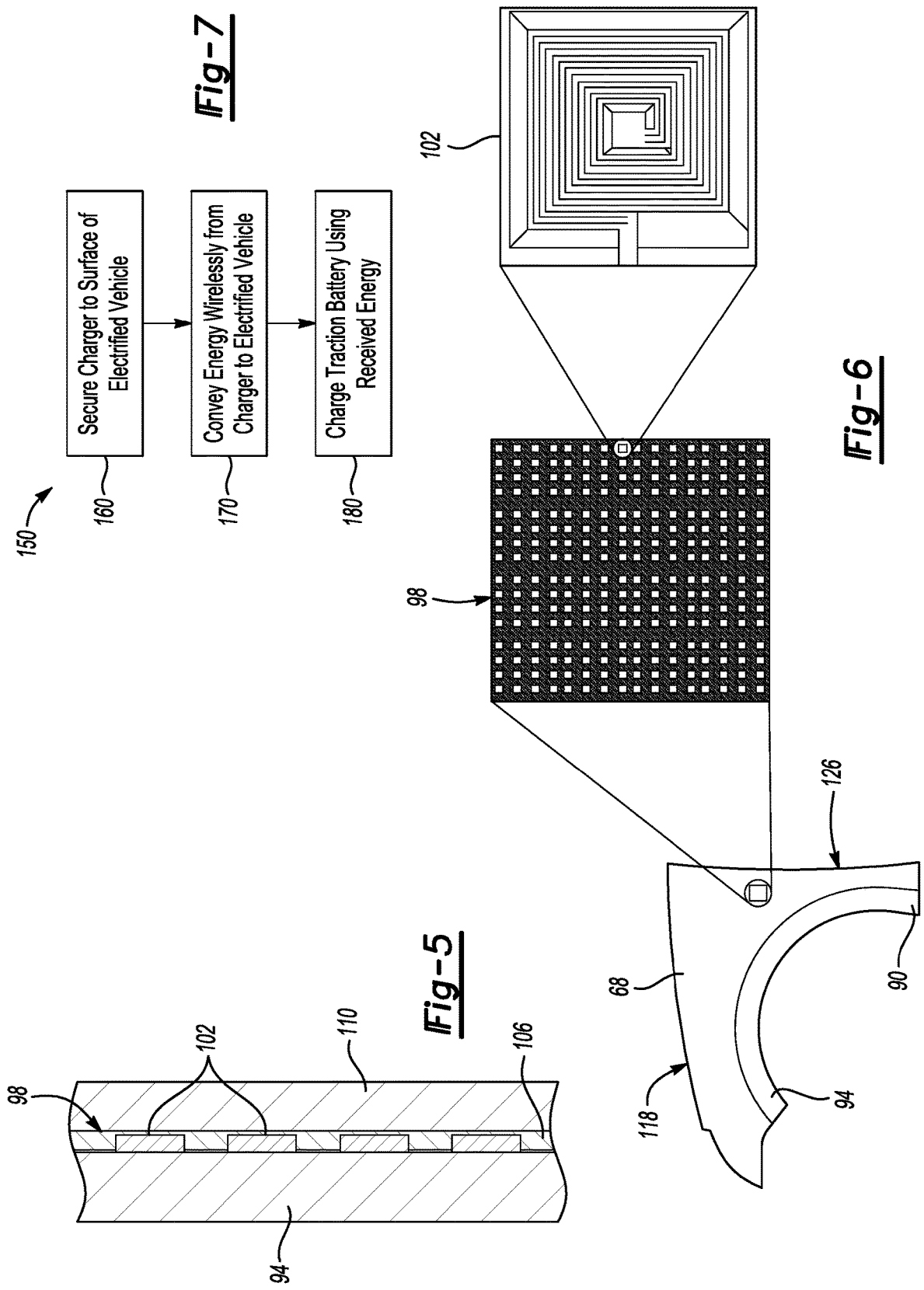

ELECTRIFIED VEHICLE WIRELESS CHARGING SYSTEM AND CHARGING METHOD

TECHNICAL FIELD

This disclosure relates generally to charging a traction battery of an electrified vehicle. More particularly, this disclosure relates to charging without requiring a plug-in charger to be received within a defined charge port.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery is a relatively high-voltage battery that selectively powers the electric machines and other electrical loads of the electrified vehicle. The traction battery can include battery arrays each including a plurality of interconnected battery cells that store energy. Some electrified vehicles, such as PHEVs, can charge the traction battery from an external power source.

Many electrified vehicles charge the traction battery via a plug-in charger that plugs into a defined charge port of the electrified vehicle. The define charge port can influence aerodynamics of the vehicle, and can require doors and other mechanisms. Rain and snow can also accumulate in the defined charge port.

SUMMARY

A charging system according to an exemplary embodiment of the present disclosure includes, among other things, a charger that conveys energy wirelessly to an electrified vehicle when the charger is disposed against a surface of the electrified vehicle. The energy is used to charge a traction battery of the electrified vehicle.

In a further non-limiting embodiment of the foregoing charging system, a magnet secures the charger to the surface of the electrified vehicle to dispose the charge against the surface.

In a further non-limiting embodiment of any of the foregoing charging systems, the magnet is an electromagnet.

In a further non-limiting embodiment of any of the foregoing charging systems, the magnet is a permanent magnet.

In a further non-limiting embodiment of any of the foregoing charging systems, the magnet is magnetic ring.

A further non-limiting embodiment of any of the foregoing charging systems includes a polymer-based coating on the magnet that blocks the magnet from directly contacting the surface when the charger is disposed against the surface.

A further non-limiting embodiment of any of the foregoing charging systems includes a radio frequency emitter of the charger that is activated to emit energy wireless from the charger for receipt by the electrified vehicle.

A further non-limiting embodiment of any of the foregoing charging systems includes a body panel assembly of the electrified vehicle that includes the surface. A receiver is integrated within the body panel assembly. The receiver receives the energy conveyed from the charger.

In a further non-limiting embodiment of any of the foregoing charging systems, the receiver is a radio frequency antenna.

In a further non-limiting embodiment of any of the foregoing charging systems, the radio frequency antenna array is a lithograph patterned on to an insulating layer.

A further non-limiting embodiment of any of the foregoing charging systems includes a body panel assembly of the electrified vehicle that includes the surface. A receiver is disposed behind a body panel of the body panel assembly relative to the charger. The receiver receives the energy conveyed from the charger.

A further non-limiting embodiment of any of the foregoing charging systems includes the surface of the electrified vehicle. When the charger is disposed against the surface, no portion of the charger is received within an opening of the electrified vehicle, and no portion of the electrified vehicle is received within an opening of the charger.

A further non-limiting embodiment of any of the foregoing charging systems includes the surface of the electrified vehicle. The charger can convey energy wirelessly to the electrified vehicle when the charger is disposed against the surface in a first position, and the charger can convey energy wirelessly to the electrified vehicle when the charger is disposed against the surface in a second position. The charger in the first position is spaced a distance from the charger in the second position.

A charging method according to another exemplary embodiment of the present disclosure includes, among other things, conveying energy wirelessly from a charger to an electrified vehicle to charge a traction battery of the electrified vehicle. The charger is disposed against a surface of the electrified vehicle during the conveying.

A further non-limiting embodiment of the foregoing method includes magnetically attaching the charger to the surface during the conveying.

A further non-limiting embodiment of any of the foregoing methods includes blocking a magnet of the charger from directly contacting the surface when the charger is secured to the surface using a polymer-based coating.

In a further non-limiting embodiment of any of the foregoing methods, during the conveying, no portion of the charger is received within an opening of the electrified vehicle, and no portion of the electrified vehicle is received within an opening of the charger.

A further non-limiting embodiment of any of foregoing methods includes emitting energy from a radio frequency emitter of the charger for receipt by the electrified vehicle during the conveying.

A further non-limiting embodiment of any of the foregoing methods includes receiving energy wirelessly conveyed from the charger using an antenna that is integrated within a body panel assembly of the electrified vehicle.

In a further non-limiting embodiment of any the foregoing methods, the charger is configured to convey energy wirelessly to the electrified vehicle when the charger is disposed against the surface in a first position, and the charger is configured to convey energy wirelessly to the electrified vehicle when the charger is disposed against the surface in a second position. The charger in the first position is spaced a distance from the charger in the second position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 5 illustrates a close-up section view of Area 5 in FIG. 4.

FIG. 6 illustrates a side view of the body panel assembly of the electrified vehicle that provides the surface of FIG. 4 with selected portions enlarged.

FIG. 7 illustrates the flow of an example charging method that uses a charging system having the charger of FIG. 3.

DETAILED DESCRIPTION

This disclosure is directed toward charging an electrified vehicle utilizing a charger that does not require a defined charge port within the electrified vehicle. Instead, the charger can be positioned against a surface of the vehicle, and energy then wirelessly conveyed from the charger to a receiver within the vehicle.

Figure 1:
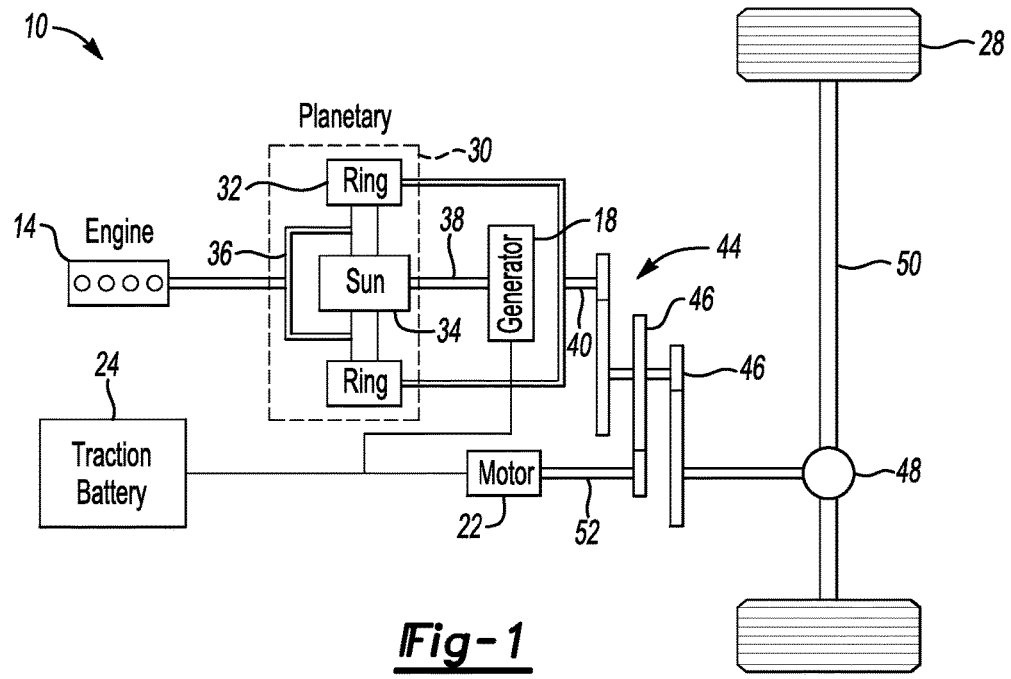
FIG. 1 illustrates a schematic view of a powertrain for an electrified vehicle.

FIG. 1 schematically illustrates a powertrain 10 for an electrified vehicle. Although depicted as a hybrid electrified vehicle (HEV), it should be understood that the concepts described herein are not limited to HEVs and could extend charging other electrified vehicles, including, but not limited to, plug-in hybrid electrified vehicles (PHEVs), fuel cell vehicles, and battery electrified vehicles (BEVs).

In the embodiment, the powertrain 10 is a powersplit powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a traction battery 24. In this example, the second drive system is considered an electric drive system of the powertrain 10. The first and second drive systems generate torque to drive one or more sets of vehicle drive wheels 28 of the electrified vehicle.

The engine 14, which is an internal combustion engine in this example, and the generator 18 may be connected through a power transfer unit 30. In one non-limiting embodiment, the power transfer unit 30 is a planetary gear set that includes a ring gear 32, a sun gear 34, and a carrier assembly 36. Of course, other types of power transfer units, including other gear sets and transmissions, may be used to connect the engine 14 to the generator 18.

The generator 18 can be driven by engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the traction battery 24.

The traction battery 24 is high-voltage battery that is capable of outputting electrical power to operate the motor 22 and the generator 18. The traction battery 24 is a traction battery as the traction battery 24 can provides power to propel the wheels 28. As a level of charge in the traction battery 24 is depleted, the traction battery 24 can be recharged to increase the level of charge.

Figure 2:
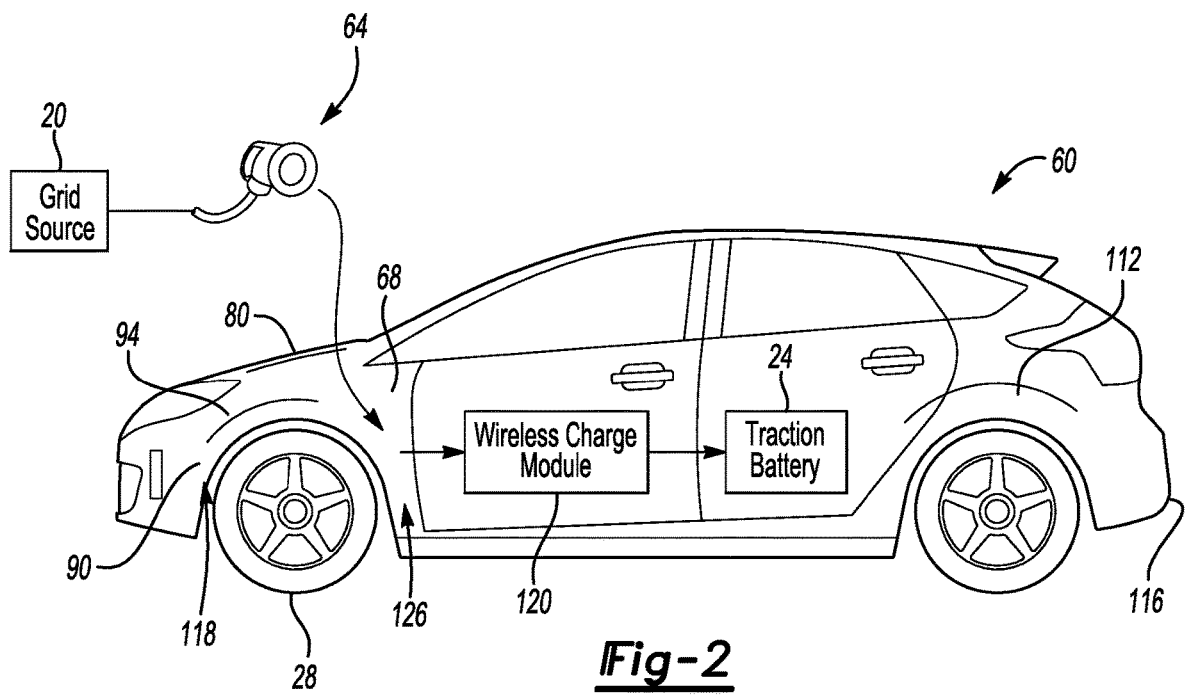
FIG. 2 illustrates a side view of a charger and an electrified vehicle having the powertrain of FIG. 1.
Figure 3:
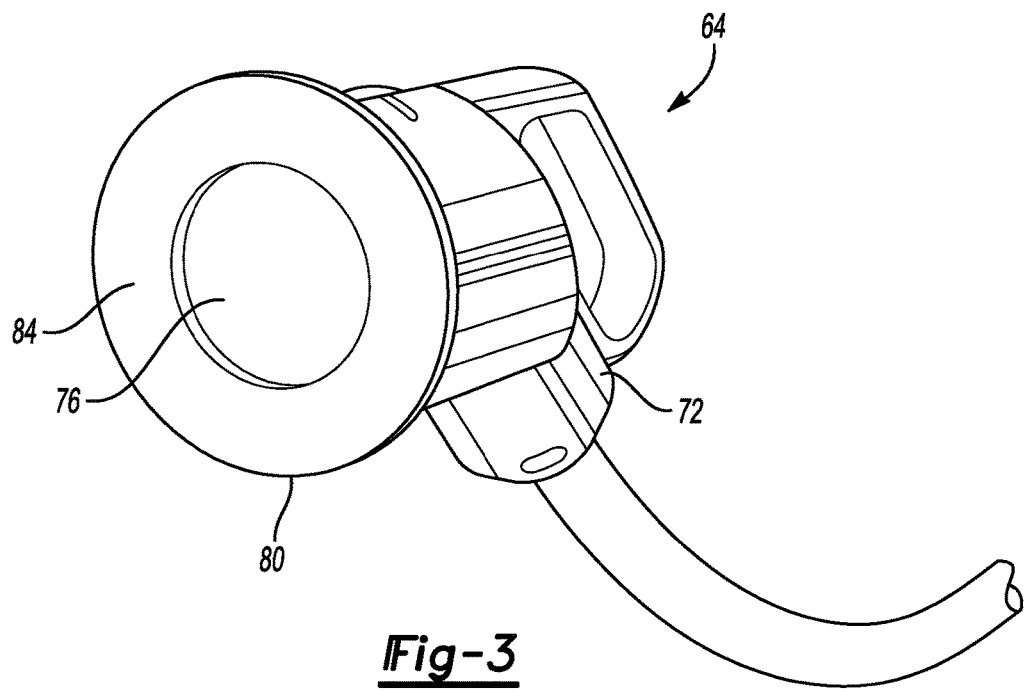
FIG. 3 illustrates a close-up perspective view of the charger FIG. 2.
Figure 4:
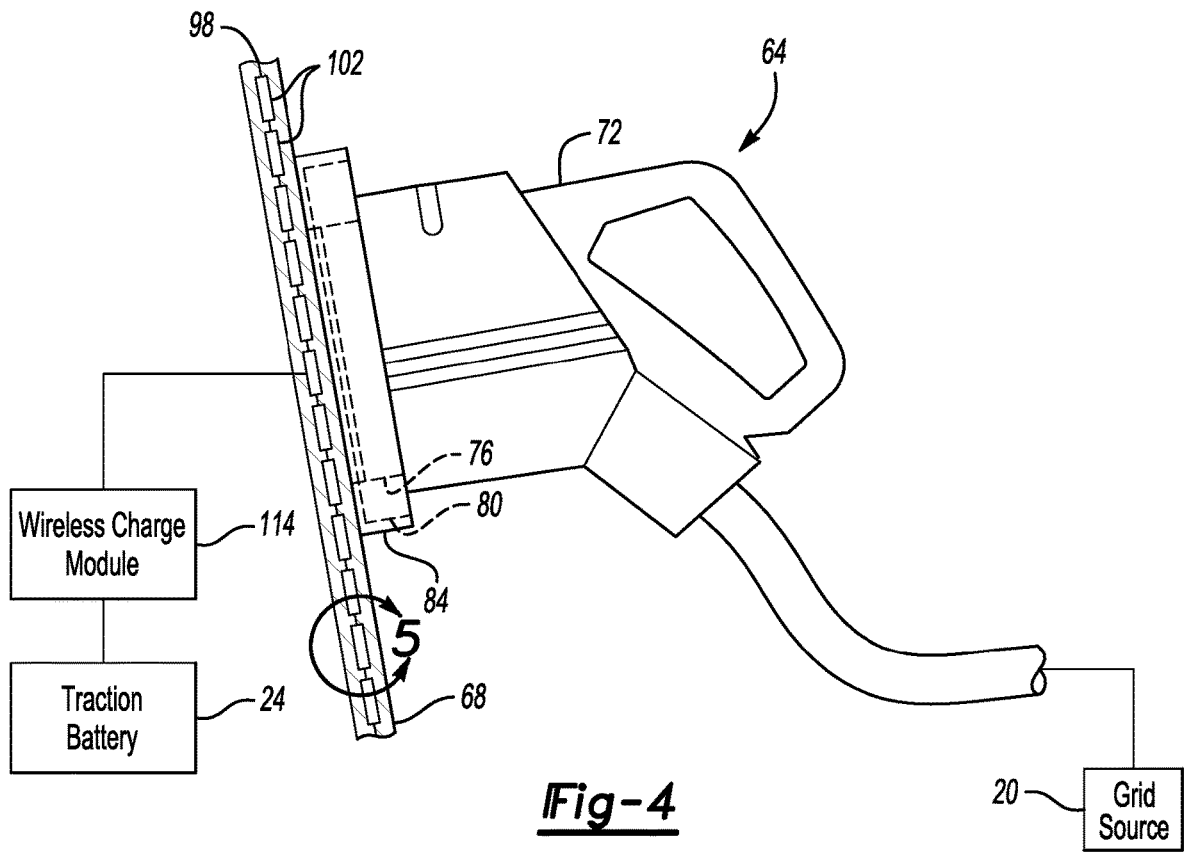
FIG. 4 illustrates a side view of the charger of FIG. 3 secured to a surface of the electrified vehicle of FIG. 2 where the surface is provided by a body panel assembly of the electrified vehicle.

Referring now to FIG. 2, an exemplary electrified vehicle 60 incorporates the powertrain 10 of FIG. 1. A charging system can be used to charge the traction battery 24 within the powertrain 10. In an exemplary non-limiting embodiment, the charging system includes a charger 64 and a surface 68 of the vehicle 60. The charger 64 is coupled to a grid source 70 of power.

With reference now to FIGS. 3-6, the charger 64 includes, among other things, a housing 72, and a wireless power emitter 76, a magnetic ring 80, and a protective coating 84.

When the charger 64 is disposed against the surface 68, the charger 64 can convey energy wirelessly to the electrified vehicle 60. Disposed against, for purposes of this disclosure, means that at least some portion of the charger 64 directly contacts the surface 68. The energy conveyed wirelessly to the electrified vehicle is used to charge the traction battery 24.

In this exemplary non-limiting embodiment, the charger 64 is secured to the surface 68 of the electrified vehicle 60 to dispose the charger 64 against the surface 68. In particular, the magnetic ring 80 is used to secure the charger 64 to the surface 68.

The magnetic ring 80 could be an electromagnet that is activated to secure the charger 64 to the surface 68, and deactivated to release the charger 64 from the surface 68. The magnetic ring 80 could instead be a permanent magnet. In still other examples, the charger 64 is secured to the surface 68 in other ways, such and via a suction or vacuum type attachment. Further, if the surface 68 were instead an upwardly facing surface, such as a surface of a hood 86, the charger 64 could be secured to the surface by resting on the surface and gravity urging the charger 64 relatively against the upwardly facing surface.

The protective coating 84 fits between the surface 68 and the magnetic ring 80 when the charger 64 is secured to the surface 68. The protective coating 84 protects the surface 68 from scratching or otherwise marring the surface 68 when the charger 64 is secured adjacent to the surface 68. The protective coating 84 can be a polymer-based coating.

The surface 68 of the electrified vehicle 60 is a surface of a body panel assembly 90. The body panel assembly 90 can include a base material 94 and an array 98 of radio frequency antennas 102. The base material 94 can be a ferrous metal or a metal alloy, such as sheet metal. The array 98 of antennas could be patterned onto the base material 94. Alternating layers of insulating and patterned antennas could be used to form a multilayered circuit. The array 98 radio frequency antennas 102 can provide a micro electro-magnetic antenna of the body panel assembly 90.

In the exemplary embodiment, the array 98 is provided utilizing lithography techniques that pattern the array 98 onto the base material 94. Additional electronics and be patterned directly onto the provided circuit as desired. In another exemplary embodiment, the array 98 is provided on the base material 94 utilizing copper that is sputtered onto a sheet-metal base material.

The base material 94 can act as a grounded substrate upon which the array 98 is placed. An insulating layer 106 can be deposited over the array 98. A layer 110 of paint and clear-coat can be applied over the insulating layer 106 and the array 98. The layer 110 helps to hide the array 98 such that the body panel assembly 90 has the same appearance as other body panels of the vehicle 60.

In this exemplary embodiment, the body panel assembly 90 provides a front, driver side fender of the electrified vehicle 60. In another example, the surface 68 is provided by another body panel assembly within the vehicle 60, such as a rear quarter panel 112 (FIG. 2). The surface 68 could be instead, or alternately, provided by other surfaces of the vehicle 60, such as a surface of a fascia 116.

When the charger 64 is secured to the surface 68, a charge of the traction battery 24 can be initiated by a user. Alternatively, the charging procedure could initiate automatically.

When the charging procedure is initiated, energy from the grid source 70 moves to the charger 64. The emitter 76 of the charger 64 conveys the energy wirelessly to the vehicle 60.

In the exemplary embodiment, the energy is conveyed wirelessly via radio frequency pulses, although other near-field communication methods could be utilized. The array 98 of antennas 102 receive the radio frequency pluses propagating from the emitter 76. Energy received by the array 98 can be passed to a wireless charge module 120 of the electrified vehicle. The charge module 120 can convert the energy received by the antennas 102 to Direct Current power, which is then utilized to charge the traction battery 24.

The charger 64 can charge the traction battery 24 provided the antennas 102 can receive the radio frequency pulses from the emitter 76 of the charger 64. As the array 98 extends across nominally the entirety of the body panel assembly 90, the charger 64 could be secured to many areas of the surface 68 and still be used to charge the traction battery 24. That is, the charger 64 could be secured to the surface 68 of the body panel assembly 90 in a first positon 118 that is forward a front one of the wheels 28 of the electrified vehicle 60. Alternately, the charger 64 could be secured to the surface 68 of the body panel assembly 90 in a second position 126 that aft of the front one of the wheels 28. In both positions, the array 98 can receive radio frequency pluses from the charger 64 since the array 98 extends within the body panel assembly 90 to both of the positions.

Because the traction battery 24 can be charged via the charger 64 disposed against the surface 68, no defined charge port within the vehicle 60 is required to charge the traction battery 24. A defined charge port typically includes openings that receive portions of a plug-in charger as the plug-in charger is plugged-in to the defined charge port during a charge. Alternatively, openings in the plug-in charger receive portions of the defined charge port. When the portions of the plug-in charger are received within openings of the charge port, or vice versa, electrical contacts of the plug-in charger directly contact electrical contacts of the charge port. The direct contact between the electrical contacts provides a direct, non-wireless path for conducting energy to the traction battery.

The charger 64 of the exemplary embodiment, in contrast to such plug-in chargers, can be used to wirelessly charge the traction battery 24 when no portion of the charger 64 is received within an opening of the electrified vehicle 60, and no portion of the electrified vehicle 60 is received within an opening of the charger 64.

In exemplary method 150 utilized by the charging system includes a step 160 of securing a charger directly to a surface of an electrified vehicle. Next, at a step 170, energy is conveyed wirelessly from the charger to the electrified vehicle. At a step 180, the energy received from the charger is used to charge a traction battery of the electrified vehicle.

Features of the disclosed examples include a charge system can charge a traction battery when a charge is adjacent a surface of an electrified vehicle. Charging procedures can be carried out without requiring a defined charge port within the vehicle, which could be aesthetically displeasing and provide a conduit for water ingress into an interior of the vehicle.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A charging system, comprising:
a charger that conveys energy wirelessly to an electrified vehicle when the charger is disposed against a surface of the electrified vehicle, the energy used to charge a traction battery of the electrified vehicle; and
a magnet that secures the charger to the surface of the electrified vehicle to dispose the charger against the surface.

2. The charging system of claim 1, wherein the magnet is an electromagnet.

3. The charging system of claim 1, wherein the magnet is a permanent magnet.

4. The charging system of claim 1, wherein the magnet is magnetic ring.

5. The charging system of claim 1, further comprising a polymer-based coating on the magnet that blocks the magnet from directly contacting the surface when the charger is disposed against the surface.

6. The charging system of claim 1, further comprising a radio frequency emitter of the charger that is activated to emit energy wirelessly from the charger for receipt by the electrified vehicle.

7. The charging system of claim 1, further comprising of a body panel assembly of the electrified vehicle that includes the surface, wherein a receiver disposed behind a body panel of the body panel assembly relative to the charger receives the energy conveyed from the charger.

8. The charging system of claim 1, further comprising the surface of the electrified vehicle, wherein, when the charger is disposed against the surface, no portion of the charger is received within an opening of the electrified vehicle, and no portion of the electrified vehicle is received within an opening of the charger.

9. The charging system of claim 1, further comprising the surface of the electrified vehicle, wherein the charger can convey energy wirelessly to the electrified vehicle when the charger is disposed against the surface in a first position, and the charger can convey energy wirelessly to the electrified vehicle when the charger is disposed against the surface in a second position, the charger in the first position spaced a distance from the charger in the second position.

10. A charging system, comprising:
   a charger that conveys energy wirelessly to an electrified vehicle when the charger is disposed against a surface of the electrified vehicle, the energy used to charge a traction battery of the electrified vehicle; and
   a body panel assembly of the electrified vehicle that includes the surface, wherein a receiver integrated within the body panel assembly receives the energy conveyed from the charger.

11. The charging system of claim 10, wherein the receiver comprises a radio frequency antenna array.

12. The charging system of claim 11, wherein the radio frequency antenna array is a lithograph patterned on to an insulating layer.

* * * * *